Oct. 6, 1970 B. J. WARMAN 3,532,825
TELECOMMUNICATION SYSTEM LINE SCANNING EQUIPMENT
Filed June 14, 1967
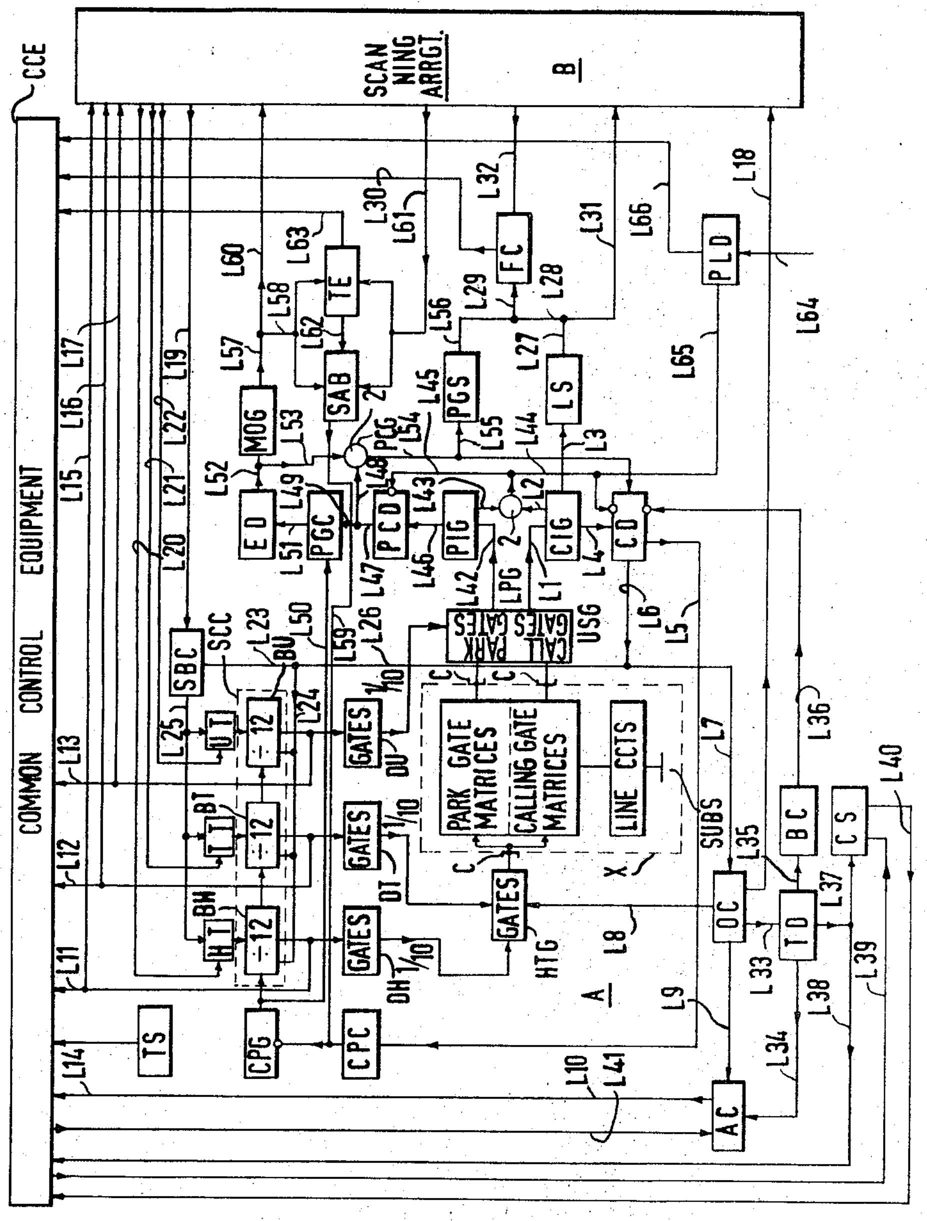

United States Patent Office 3,532,825
Patented Oct. 6, 1970

3,532,825
TELECOMMUNICATION SYSTEM LINE SCANNING EQUIPMENT

Bloomfield James Warman, Charlton, London, England, assignor to Associated Electrical Industries, Limited, London, England, a British company Filed June 14, 1967, Ser. No. 645,930
Int. Cl. H04q 1/52, 3/24
U.S. Cl. 179—18 12 Claims

ABSTRACT OF THE DISCLOSURE

For use in an automatic telecommunication switching system, line scanning equipment comprising two scanning circuit arrangements, adapted to scan line circuits alternately by having alternate working and stand-by roles, in which the scanning arrangement which is on stand-by checks the identity of any circuit detected and identified by the working scanning arrangement during scanning, a fault signal being produced if the check does not confirm the identity of the circuit identified by the working scanning arrangement.

CROSS-REFERENCES TO RELATED PATENTS

British patent specifications Nos. 946,840 and 948,367 which correspond respectively to U.S. Pats. Nos. 3,202,767 and 3,231,681 are referred to in the disclosure.

BACKGROUND OF THE INVENTION

This invention relates to automatic telecommunication switching systems and more especially to scanning circuit arrangements of the character employed in such systems and adapted to scan, usually recurrently, each of a plurality of circuits in turn and effective upon detecting a circuit of said plurality exhibiting a distinctive marking to provide the identity of such marked circuit as output signals on a unique combination of identification leads. Such a scanning circuit arrangement has a number of well-known applications in automatic telecommunication switching systems. For instance, it may be employed in conjunction with a plurality of registers for identifying to a translator a register that is marked as requiring its services, or it may be employed in conjunction with subscribers' line circuits for identifying to a register or other exchange equipment a line circuit that is in a calling or other marked condition.

For a particular scanning function, for example the scanning of subscribers' line circuits, duplicate scanning circuit arrangements of the above character may be provided for security purposes, the duplicate arrangements being so organised that one is on stand-by while the other is working, and that upon failure of the working arrangement to perform its scanning function, the working and stand-by arrangements have their roles changed over automatically so that the stand-by arrangement takes over the working role, while the hitherto working arrangement is switched out of service and an alarm is given to draw attention to the failure. However, it is possible for a scanning circuit arrangement, while still able to perform its scanning function, to be faulty in other respects. For example, during scanning, faults may occur such as the incorrect detection of a circuit being scanned when the circuit is not exhibiting a distinctive marking requiring it to be identified, or the incorrect identification of a circuit being scanned and exhibiting a distinctive marking requiring the circuit to be identified. Also, faults not directly attributable to scanning but nevertheless related thereto may occur, such as in the case of a line scanning circuit arrangement the failure of exchange equipment to establish connection between a calling line detected and identified as such by the arrangement and a register equipment for the reception of dialled impulses from the calling line. Hitherto, such faults have often not been detected until complaints have been received from subscribers suffering from the effects of them.

The present invention proposes scanning circuit arrangements in which the occurrence of faults such as referred to above are automatically detected and recorded so that corrective action can be taken with a minimum of delay.

SUMMARY OF THE INVENTION

According to the present invention there is provided in respect of a plurality of circuits, scanning equipment in which two scanning circuit arrangements of the character referred to are organized such that one arrangement is a stand-by arrangement while the other is working and in which upon the working arrangement detecting a distinctive marking exhibited by one of said circuits and providing output signals, purporting to identify such circuit, on a unique combination of the identification leads, the stand-by arrangement is rendered operative by these output signals to perform a check on the circuit having the identity signified by the output signals, a fault signal being produced if the check does not confirm the identity of the circuit identified by the output signals produced by the working scanning circuit arrangement.

In carrying out the invention it is preferably arranged that exchange equipment embodying the scanning equipment proceeds to act on the identification output signals produced by the working scanning circuit arrangement and ignores the existence of the fault signal, hereinafter termed a "Fault 1" signal, resulting from the check made by the stand-by scanning circuit arrangement.

Preferably also, the scanning equipment is organized such that the two scanning circuit arrangements exchange their working and stand-by roles at the end of each complete scan of the plurality of circuits so that one arrangement is the working arrangement for one scanning cycle while the other arrangement is on stand-by, their roles being reversed for the next scanning cycle, and so on. By this means it is ensured that a fault which may develop in either arrangement can be detected quickly.

Furthermore, each scanning circuit arrangement may include timing means arranged such that the arrangement that is on standby in a scanning cycle can "time-out" the other, working, arrangement, if no signal indicating that the latter arrangement has completed the scan for that cycle is received by the stand-by arrangement within a pre-determined time from the beginning of the scanning cycle, a signal being passed by the stand-by arrangement to the working arrangement as a result of the "time-out" to cause the latter to assume the stand-by role, with the stand-by arrangement assuming the working role. A further fault signal indicative of this faulty condition resulting in "time-out" of the working arrangement may be initiated but, preferably, it is arranged that such fault signal, hereinafter termed a "Fault 2" signal, is initiated only if the same scanning circuit arrangement is "timed-out" in each of two successive scanning cycles in which it is the working arrangement.

In the application of scanning equipment according to the present invention to line scanning with the working scanning arrangement arranged, as in U.S. Pat. No. 3,231,681 for example, to stop scanning upon detecting a calling line and to wait until a connecting path has been established between the calling line and a register before scanning is continued, the scanning equipment may include further timing means which is operable to initiate a further fault signal if such connecting path is not established within a predetermined time period after the working scanning circuit arrangement of the scanning equipment has produced the output signals identifying the calling line. With regard to such further fault signal, it is preferably arranged that after a suitable part of the total time delay period being timed by further timing means has elapsed, connection is interrupted between the working scanning arrangement and exchange control equipment adapted to receive the identification output signals produced by the working scanning arrangement and then reestablished so that the working scanning arrangement in effect re-applies to such exchange control equipment to cause the latter to make a second attempt to establish the connecting path to the calling line, said further timing means being re-set to commence timing a second time delay period at the end of which, if the connecting path has still not been established, an appropriate fault signal, hereinafter termed a "Fault 3" signal, is initiated. Also, digital stores may be included in the scanning equipment and the exchange control equipment may be arranged to record within these stores the identity of the connecting path which it is attempting to establish.

It will be appreciated that by arranging for the three fault signals referred to above, together with all relevant information, such as the scanning equipment identity (where a number of such equipments are provided for respective pluralities of circuits), line circuit identity and and connecting path identity, to be printed out by, say, a teleprinter, not only is the fault recorded immediately it occurs, but also diagnosis of the faulty equipment is greatly facilitated.

A further feature of scanning equipment according to the present invention relates specifically to an improvement of the line scanning circuit arrangement described in U.S. Pat. No. 3,231,681. Each line circuit served by this scanning circuit arrangement has a "calling" gate and a "PG" or "park" gate, these gates taking the form of simple pulse-plus-bias gates. The "calling" gate of a line circuit is biassed on the occurrence of a calling condition by a potential fed to it as a result of the line wires being looped at the calling subscriber's station apparatus, and the biassed "calling" gate is detected by the line scanning arrangement which halts its scanning and identifies the calling line circuit to exchange equipment to cause the latter to bring about the establishment of a connecting path between the calling line circuit and the register. On completion of this path, a line relay in the line circuit operates and interrupts the biassing of the "calling" gate so allowing the scanning circuit arrangement to re-commence scanning. However, should the calling subscriber fail to dial within a pre-determined time period, the register concerned is arranged to be released from the connecting path so that it can serve other calls and the calling line circuit is parked in a so-called PG condition. This parking is achieved upon release of the register by arranging for relay action within the line circuit to bring about the biassing of the "park" gate and to permit the re-biassing of the "calling" gate for as long as the subscriber's line is looped. The scanner circuit arrangement is arranged to ignore this condition in which both "calling" and "park" gates are biassed. When the calling condition on the subscriber's line wires is terminated by removal of the line loop, the "calling" gate is no longer biassed, leaving the "park" gate biassed alone, which condition is recognized by the line scanning circuit arrangement which upon detecting the condition, identifies the line circuit as being parked to exchange equipment which is responsive to restore the line circuit to normal.

However, with this particular line scanning circuit arrangement, it has been found that the PG condition, i.e., with both the "calling" and "park" gates biassed, may sometimes be mistaken for the PG clear condition, i.e., the "park" gate alone biassed. This arises because when connection is effected initially between a calling line circuit and a register, the "calling" gate is disconnected from the subscriber's line wires in order to remove the biassing potential, but when the register disconnects itself from the line circuit the "calling" gate is re-connected to the line wires by the aforementioned relay action and becomes biassed again, dependent on the continued persistence of a loop across the line wires, together with the "park" gate. However, the biassing of the "calling" gate is dependent upon the charging of the gate capacitor so that a short, but significant, time delay may elapse before the "calling" gate becomes sufficiently biassed to produce a detectible output signal on being scanned. Thus, during the period of such short time delay, the line circuit may appear to the scanning circuit arrangement as being in the PG clear condition with only the "park" gate biassed.

In order to overcome this difficulty incurred with such particular scanning circuit arrangement, scanning equipment in accordance with the present invention may be so arranged that when a PG clear condition is detected, a persistence check is made lasting for one complete scanning cycle of the working scanning circuit arrangement and timed by counting means, which is included in the arrangement and is stepped in synchronism with the stepping of the arrangement itself, said counting means being capable of counting the full number of steps effected by the arrangement during one complete scanning cycle. The arrangement may be prevented from interrogating any other lines in the PG clear condition during such scanning cycle and may be such that if after the check has been made, the PG clear condition is found to persist, upon re-interrogation the arrangement is halted at the line circuit and identifies the latter as for a normal calling line, whilst also providing an indication of the PG clear condition. Preferably, it is arranged that calling line circuits encountered during the persistence check are dealt with in the normal way as previously described, the resulting increase in the persistence check period being without effect.

BRIEF DESCRIPTION OF THE DRAWING

Scanning equipment in accordance with the present invention is exemplified in block schematic form in the accompanying drawing to which reference will now be made in the following description which will enable those versed in the art to understand clearly one manner of putting the invention into effect.

DESCRIPTION OF THE PREFERRED EMBODIMENT

Referring to the drawing, the scanning equipment there schematically shown comprises two scanning circuit arrangements, namely, a scanning circuit arrangement A which is represented fully in block schematic form, and a scanning circuit arrangement B which is identical with the arrangement A and is shown in outline only. Common control equipment of an automatic telephone exchange with which the scanning equipment is operatively associated is represented by the rectangle CCE. The items in the dotted line rectangle X represent the line circuits terminating a group of 1000 subscribers' lines, the line circuits including respective "calling" and "park" gates which are pulse-plus-bias gates. Each such line circuit is conveniently of the form described in United States Pat. No. 3,231,681. The "calling" and "park" gates are arranged in separate matrices which are adapted to be interrogated in groups sequentially by combining "hundreds" and "tens" markings produced by a counter SCC (in each of the scanning arrangements A and B) with individual interrogation of each gate in an interrogated group performed by a "units" marking from the scanner counter SCC. Such grouping is described fully in U.S. Pats. No. 3,202,767. In the present instance the grouping is such that there are five "calling" gate matrices each containing 200 "calling" gates and, correspondingly, five "park" gate matrices each containing 200 "park" gates. Each matrice is interrogated by gating together the ten, "tens" outputs from the counter SCC with one of the "hundreds" outputs therefrom to form one set of ten interrogating inputs to the matrice, and with a second of the "hundreds" outputs to form a second set of ten interrogating inputs to the matrice, the matrics being arranged with their gates arranged in ten rows and twenty columns and interrogated, column by column, by the twenty interrogating inputs from the "hundreds" and "tens" combining gates. The ten outputs from each column are then applied to one input each of a set of 10 "units" combining gates each of which also has applied to it a respective "unit" output from the counter SCC, so that of a column of ten interrogated gates, only the one associated with the particular "units" combining gate to which a "units" marking is applied, will be capable of causing an output signal to be produced in dependence on the setting of the counter SCC at any step in a scanning cycle.

Consider now the scanning equipment in greater detail, as shown for arrangement A, each of the two scanning arrangements includes, as aforesaid, a scanner counter SCC, which conveniently comprises a chain of bistable elements arranged to form three divide-by-12 groups BH, BT and BU of bistable elements, each group containing four bistable elements arranged to effect a cyclic count of twelve in a modified binary counting cycle. The respective binary output codes from the three counting groups are decoded by respective groups of decoding gates DH, DT and DU to respective one-out-of-ten markings, two of the possible binary output code combinations of each group being redundant in regard to this decoding. The groups of decoding gates DH, DT, DU provide the "hundreds," "tens," and "units" markings respectively, of which the "hundreds" and "tens" markings are gated together, as previously explained, by selection gates HTG to provide the two sets of ten interrogating inputs for each of the five "calling" and five "park" gate matrices represented at X. The "units" markings are gated with the matrix row outputs by means of "calling" and "park" selection gates USG. The "commons" C serve to indicate that gates corresponding to gates HTG and USG in the scanning arrangement B are similarly connected to the "calling" and "park" gate matrices.

In accordance with the invention, the two scanning arrangements A and B are arranged so that one is on standby while the other is working, with the two arrangements being further arranged, as will be described, to change over their roles at the end of each scanning cycle. For the present purposes, it will be assumed that, initially, arrangement A is working and arrangement B is on standby. In this condition, the scanner counter SCC in arrangement A is stepped by 5 kc./s. pulses from a pulse generator CPG, a different "calling" and "park" gate pair being interrogated at each step of the scanner counter SCC.

Assume now that one of the "calling" gates which is interrogated is in the calling condition, so that as a consequence of its interrogation an output signal is produced from the relevant one of the selection gates USG on lead L1. This signal on lead L1 is applied to a "call interrogate gate unit" CIG where it is strobed to provide three output signals. One output signal is applied over a lead L2 to one input of a gate LPG, but this gate is ineffectual of this time due to the absence of a signal applied to a second input thereof. A second output from unit CIG is applied over a lead L3 to a "line security element" LS, the function of which will be dealt with later, and the third output signal is applied over a lead L4 to a bistable "call detecting element" CD which is operated to its set condition on receipt of this signal.

Upon being set, the element CD applies a signal over a lead L5 to set a bistable "clock pulse control" element CPC to cause it to produce a signal which inhibits the pulse generator CPG and thereby halts the scanning action of arrangement A. A second output signal from element CD is applied over leads L6 and L7 to bring about the operation of a 50 c.p.s. oscillator OC. One output from this oscillator OC is applied to the selection gates HTG over a lead L8 in the form of a continuous train of strobing pulses, whereby the "calling" gate in question is continuously interrogated so that the eventual establishment of a connecting path between the calling line circuit and a register can be detected by the working scanning arrangement in the manner described in U.S. Pat. No. 3,231,681. A second output signal from the oscillator OC is applied over a lead L9 to set a bistable "ask control element" AC which on being set applies a signal over a lead L10 to cause the common control equipment CCE to effect coupling between itself and the scanning equipment. Coupling arrangements for this purpose in the common control equipment CCE are suitably of the form described in U.S. Pat. Ser. No. 569,230. Also, by virtue of the setting of the scanner counter SCC, binary coded markings indicative of the "hundreds" ,"tens" and "units" digits of the calling subscriber's directory number are also being presented to the common control equipment CCE over sets of identification leads represented generally by leads L11, L12 and L13, together with a "thousands" digit marking derived from a strapping in a terminal strapping field TS and presented over a lead L14. At the same time, the "hundreds", "tens" and "units" code markings are also applied over sets of leads represented generally by leads L15, L16 and L17 to the scanning arrangement B which is on stand-by. Also, a signal is passed to the arrangement B over a lead L18 from the oscillator OC.

Since the two scanning arrangements A and B are identical, the operations which now take place in arrangement B will be described as taking place in arrangement A. Thus, the markings applied over the sets of leads L15, L16 and L17 to arrangement B appear in arrangement B on sets of leads corresponding to the sets of leads L20, L21 and L21 which extend from arrangement B to arrangement A. These sets of leads are connected to respective groups of "check gates" HT, TT and UT which are associated individually with the three bistable element groups BH, BT and BU of the scanner counter SCC, the leads of each set forming one, priming, input to individual gates of the appertaining group. Also, the signal applied over lead 18 appears in arrangement B on a lead corresponding to lead 19 and sets a bistable "setback control element" SBC. In arrangement B, output signals are applied from the element SBC over leads L23 and L24 to re-set the bistable elements of the scanner counter SCC (this counter having been left off-normal at the end of the preceding scanning cycle when the arrangement B was the working arrangement), and over lead L25 to actuate the primed gates HT, TT and UT which produce output signals which set the scanner counter in arrangement B in accordance with the calling subscriber's directory number markings extended from arrangement A. Also, the signal on lead L23 is applied over lead L26 to start the 50 c.p.s. oscillator OC in arrangement B. As a result a signal will be applied over the lead in arrangement B corresponding to lead L8 to cause the "calling" and "park" gates identified by the identification markings applied from arrangement A to arrangement B to be interrogated. Assuming that the "calling" gate thus interrogated is the same as that initially interrogated by arrangement A, then this gate will be found to be in the calling condition with the result that a signal will appear on the lead in arrangement B corresponding to lead L1 and the gate CIG in arrangement B will produce output signals in the same way as did the gate CIG in arrangement A.

When the "calling" gate concerned was initially interrogated by arrangement A, gate CIG therein produced a signal on lead L3 to energise element LS. Upon being energised, this element LS provides an output signal over leads L27, L28 and L29 to set a bistable "fault control element" FC so that the latter applies over a lead L30 a "Fault 1" signal to the common control equipment CCE. Also in the arrangement B as a result of the interrogation by it of the "calling" gate concerned, a signal will have been applied from gate CIG over the corresponding lead L4 to energise element LS. In this instance the signal on lead L27 from element LS is applied over lead L31 to arrangement A where it appears as a signal on lead L32 to re-set the element FC, thereby removing the "Fault 1" signal on lead L30. The common control equipment can be arranged to expect the brief appearance of the "Fault 1" signal and to accept the removal of this signal as an indication that it may proceed to carry out a programme of operations leading to the establishment of a connecting path between the calling line and a register equipment. Should the "calling" gate directory number passed to arrangement B by arrangement A have been a wrong number, that is, it does not identify the "calling" gate interrogated by arrangement A, then since to a good degree of probability the "calling" gate actually identified by such number would not also be in the calling condition and assuming that this is the case, the gate CIG in arrangement B will remain closed in this circumstance so that the element LS will remain unenergised so that no re-setting signal will be received in arrangement A over lead 32 to re-set the element FC and the "Fault 1" signal will therefore persist. The common control equipment CCE may be arranged so that upon the persistence of the "Fault 1" signal being detected, all the signalling leads from the scanning equipment are coupled to a teleprinter so that all information available, including the "Fault 1" signal and the full directory number giving rise to this fault signal is printed out. However, the common control equipment is conveniently further arranged to use the scanning equipment information to establish a connecting path between the calling line and a register equipment on the assumption that the working scanning arrangement is correct. If this is not so, and in fact a calling condition does not exist at the "calling" gate indicated, further security, as to be described, will detect the fault.

When the oscillator OC in arrangement A is started by the setting of element CD as previously described, an output signal from this oscillator is applied to a "time-out delay element" TD over a lead L33. The total time delay produced by this element is of the order of 160 milliseconds, which is greater than the time required for the common control equipment CCE to establish a connecting path between a calling line and a register equipment. After the elapse of part of the time-delay period, say 40 milliseconds after the commencement of timing, a signal is passed from the element TD over a lead L34 to re-set the element AC, thereby terminating the "ASK" signal on lead L10. When the full time-delay period of 160 milliseconds has elapsed, a signal is again passed from element TD over lead L34 to element AC to set the latter again so that the "ASK" signal re-appears on lead L10 to request the common control equipment to make another attempt to establish the required connecting path. The element TD is re-set and the timing of a second time-delay period commenced by it. After the elapse of the second full time-delay period without the required connecting path having been established, a signal is passed over a lead L35 to set an "abandon control element" BC which on being set, passes a signal over a lead L36 to re-set the element CD. The element CD upon re-setting, removes the start signal for the oscillator OC which thereby ceases to function. Also, the re-setting of element CD removes the signal on lead L5, thereby allowing the generator CPG to start again to permit the scanning arrangement to resume its scanning action. Also, the element TD has applied a signal over leads L37 and L38 to the common control equipment CCE as a "Fault 2" signal to indicate that the call has been abandoned as a result of the time-out. Optionally, each of the two scanning arrangements of the scanning equipment may include storage elements CS, or may share such elements in common, in which information identifying switching equipment through which the common control equipment CCE is attempting to establish a connecting path between a calling line and a register equipment is stored, this information being passed by the common control equipment CCE to the storage elements CS over leads represented by lead L39 and returned to the equipment CCE over leads represented by lead L40, for print out by a teleprinter, by actuation of the stores CS by the signal applied to them from the element TD over lead L37. It is mentioned that the common control equipment CCE would be arranged to release itself from the scanning equipment between successive attempts to establish a connecting path and that on a successful attempt being made, would apply a release signal over a lead L41 to re-set the element AC of the working scanning arrangement.

If the working scanning arrangement encounters a line circuit in the PG or parked condition, that is, with both its associated "calling" and "park" gates in the biassed condition, the scanning of such line circuit by the arrangement causes signals to appear on leads L1 and L42, resulting in the energisation of both the "call interrogate gate unit" CIG and a "park interrogate unit" PIG. Output signals are passed from these units over leads L2 and L43, respectively, to open gate LPG, and the resulting output signal from this latter gate is applied over leads L44 and L45 to inhibit both the "call detecting element" CD and a "PG clear detecting element" PCD so that neither of these two elements responds to the calling and PG signals and, therefore, the scanning arrangement continues its scanning action without any further circuit actions taking place in respect of such line circuit.

Consider now if a "PG clear" condition is encountered by the working scanning arrangement, that is a condition in which only the "park" gate of the line circuit is biassed to indicate that the line is to be restored to service from the parked condition. It will be recalled that in this condition it is necessary to perform a persistence check to ensure that the PG clear condition is a bona-fide one and is not a condition exhibited by a line circuit which has just become parked but in respect of which the "calling" gate has not yet been biassed by current from the persisting calling loop. This persistence check is effected as follows by the working scanning arrangement.

Upon a PG clear condition being encountered, a signal is applied from the relevant selection gate USG over lead L42 to energise gate PIG. An output signal from gate PIG is applied over a lead L46 to set the element PCD which in turn provides a signal over leads L47 and L48 to one input of a gate PCG and over leads L47 and L49 to re-set a "PG counter" PGC. This counter PGC is a replica of the scanner counter SCC and is stepped in synchronism therewith by pulses applied to it from pulse generator CPG over a lead L50. Thus, the only effect of the initial detection of a PG clear condition is the re-setting to normal of the counter PGC and the actuation of a further logic element (not shown) which is arranged on actuation to inhibit the "park" gates while the scanner counters SCC and PGC step thorugh one complete scanning cycle. When the counter PGC has reached the last step in its count, the scanner SCC will have executed one complete scanning cycle from the PG clear line in question back to this line, coincidently with the arrival of the counter PGC to the last step in its count. When the counter PGC reaches this last step, it applies a signal over a lead L51 to set an "end of scan detecting element" ED. Also, the inhibition is removed from the "park" gates and the "calling" and "park" gates of the line circuit in question are re-interrogated. If the line circuit is again found to be in the PG clear condition, that is, a signal appearing on lead L42 only, the element PCD will be set again to apply a signal as one input to gate PCG. Since the element ED is also set a signal is applied therefrom over lead L52 and L53 to a second input of gate PCG so that this gate is opened and applies over leads L54 and L55 a signal which sets a "PG security element" PGS. The signal on lead L54 also sets the element CD. The arrangement now behaves in the same way as described above for an ordinary call, except that the element PGS, instead of element LS, operates to perform a "Fault 1" check by the applied of a signal over a lead L56 to element FC. Thus, the generator CPG is inhibited to halt the scanning action and the oscillator OC is started up to operate element AC to cause the arrangement to become coupled to the common control equipment CCE. Upon receipt of the relevant information from the scanning arrangement, the equipment CCE operates to establish a connecting path between the line circuit in question and a register equipment which will thereupon effect clear-down of the line from the PG condition. As a result of the clear-down, the "park" gate concerned no longer produces an output signal when interrogated by the oscillator OC with the result that element PCD is re-set and removes the signal from gate PCG which therefore closes to remove the signal from element CD which thus re-sets as well.

In the case of a calling condition, the re-setting of element CD brings about the re-starting of the scanning action as described above: in the case of a PG clear condition, this does not occur, but instead the operations now to be described take place to bring about a change over of the roles of the two scanning arrangements, the working arrangement A being made the stand-by arrangement and the stand-by arrangement B being made the working arrangement. It is also arranged that the two arrangements change over roles in any event at the end of each complete scanning cycle.

As previously mentioned, the counter PGC is a replica of the scanner counter SCC and is stepped in synchronism therewith. Assume that the arrangement A is the working arrangement and that it has just reached the end of a complete scanning cycle. The counter PGC will also have been stepped to the end of its count to operate element ED as mentioned previously. The signal on lead L52 from element ED starts a pulse generator MOG so that the latter applies a 1-millisecond pulse over leads L57 and L58 to initiate operation of a "1.5-second time-out element" TE and also to operate a "scanner control element" SAB. When operated, the element SAB produces an output signal over a lead L59 to inhibit the pulse generator CPG. The 1-millisecond pulse from the element MOG is also applied over a lead L60 to the scanning arrangement B where it appears on a lead corresponding to lead L61. In arrangement B, the element TE is in the process of timing its 1.5-second time-out period, having been actuated at the end of the previous working scan of arrangement B, but receipt of the 1-millisecond pulse over the lead L61 causes this element TE to be re-set. The 1-millisecond pulse from arrangement A is also applied to the element SAB in arrangement B to re-set the latter and thereby allow the generator in arrangement B to re-start to initiate the scanning action of arrangement B.

Should, for any reason, the 1-millisecond pulse fail to appear on lead L61 in arrangement B within the 1.5-second time-out period, a signal is produced on the elapse of this period by element TE which, in effect replaces the 1-millisecond signal from element MOG by a signal to element SAB on a lead L62 and thereby forces the two scanning arrangements to change over their roles.

Within the element TE of the arrangement which is now the working arrangement, a memory toggle (not shown) is set to record that the last 1-millisecond pulse failed to arrive within the 1.5-second time-out period, so that when the scanning cycle being performed by this arrangement is completed, this element TE will again time the 1.5-second time-out period, and if again the 1-millisecond signal fails to appear on lead L61, the element TE, as well as effecting a further forced change over of the roles of the two scanning arrangements, also applies a "Fault 3" signal over a lead L63 to the common control equipment CCE, where appropriate action (not forming part of the present invention) is taken to identify the faulty scanning equipment and to actuate appropriate alarm circuits.

An additional facility that may be provided is that during operation of the scanning equipment an indication can be obtained of the number of lines which for the time being, are in the PG condition. This is achieved by providing in each scanning arrangement a "PG line detecting element" PLD which is conditioned for operation by a signal applied to it over a lead L64, this signal being produced, for example, by operating a key switch. Each time a line in the PG condition is encountered during scanning by the working scanning arrangement, a signal is applied from the output of gate LPG over a lead L65 to a second input of element PLD which is then responsive to apply an output over a lead L66 to the common control equipment CCE. At the same time the numerical identities of these lines can be obtained from the outputs from the scanner counter SCC, so that the arrangements provided can cater for indicating the PG lines either as a total, or as individual identities.

In the scanning equipment just described, the individual logic elements may be of any suitable known form, and it is thought to be well within the capability of persons skilled in the art to provide suitable circuits for these logic elements having regard to the functions they have to perform in the overall scanning equipment.

What is claimed is:

1. Scanning equipment for a telephone switching system comprising first and second scanning circuit arrangements for alternative scanning of a plurality of circuits, each of said scanning circuit arrangements having a working role and a standby role and each said arrangement scanning, in the working role thereof, a plurality of circuits, and responding to a distinctive marking exhibited by any one of said circuits to provide output signals purporting to identify said one circuit, means responsive to said output signals for rendering the stand-by arrangement operative and responsive to the marking exhibited by said one circuit, and means for providing a fault signal in response to the non-detection of said distinctive marking by said stand-by arrangeemnt.

2. Scanning equipment according to claim 1, including means responsive to the end of each complete scan of said plurality of circuits for interchanging the working and stand-by roles of the first and second scanning circuit arrangements so that one arrangement is the working arrangement for one scanning cycle while the other arrangement is on stand-by, the roles of said arrangements being reversed in successive scanning cycles.

3. Scanning equipment according to claim 2, wherein each scanning circuit arrangement includes means, operative in the working role, for producing an end-of-scan signal indicating the completion of a scan of said plurality of circuits, timing means operative in the stand-by role and responsve to the absence of said end-of-scan signal from the working arrangement within a predetermined period from the beginning of a scan cycle for producing a "time-out" signal, and means operative in the working role and responsive to a "time-out" signal from the stand-by arrangement for interchanging the working and stand-by roles of the first and second arrangements.

4. Scanning equipment according to claim 3, including means responsive to time-out by said timing means for producing a further fault signal indicative of a fault in the working arrangement.

5. Scanning equipment according to claim 4 wherein said means responsive to time-out includes a memory store responsive to two consecutive "time-outs" of the same scanning arrangement for initiating said further fault signal.

6. Scanning equipment according to claim 1, wherein a calling line condition of any of said plurality of circuits is characterized by a distinctive marking, said equipment including scan control means responsive to a calling line marking for stopping the working scanning circuit arrangement upon the detection of a calling line, said scan control means being further responsive to the establishment of a connecting path between said calling line and a register to re-start the working scanning circuit arrangement, said equipment further including connection timing means responsive to the identification of a calling line for producing a connection fault signal in the condition that said connecting path is not established within a predetermined connection period.

7. Scanning equipment acording to claim 6, wherein said calling line identification signals are supplied to exchange control equipment over an identification signal connection, and wherein said connection timing means includes means responsive to the elapse of a predetermined part of said connection period for interrupting said identification signal connection, and means responsive to the elapse of the whole of said connection period for remaking said identification signal connection so that a second attempt to establish said connecting path is made, said means responsive to the elapse of the whole of said connection period also resetting said connection timing means to initiate a second connection period and produce, at the end of said second connection period, said connection fault signal, in the condition that said connecting path has not then been established.

8. Scanning equipment according to claim 1, wherein said plurality of circuits are line circuits each having "calling" and "park" gates associated therewith, a calling gate exhibiting a distinctive marking in the condition of a request for service, and a park gate exhibiting a distinctive marking in a restore-to-normal condition, said calling and park gates both being scanned by said scanning equipment.

9. Scanning equipment according to claim 8, wherein each scanning circuit arrangement includes gating means responsive to a distinctive marking exhibited by the "calling" and "park" gates associated with each line circuit for providing an identification of a line circuit in the condition that one but not both of the "calling" and "park" gates exhibited said distinctive marking.

10. Scanning equipment according to claim 9, and including delay means responsive to the distinctive marking exhibited by a "park" gate for delaying its presentation to said gating means, identification of the associated line circuit being inhibited by said gating means when said distinctive marking appears on the associated "calling" gate during the delay period.

11. Scanning equipment according to claim 10, wherein said delay means comprises a digital counter stepped in synchronism with the respective scanning circuit arrangement and having a count equal to the number of steps in the scan cycle.

12. Scanning equipment according to claim 11, and including inhibiting means responsive to the initiation of said delay period for preventing the interrogation of any "park" gates other than that "park" gate which initiated the delay means.

References Cited

UNITED STATES PATENTS

| | | |
|---|---|---|
| 3,073,907 | 1/1963 | Alterman et al. |
| 3,420,960 | 1/1969 | Jacoby et al. |

WILLIAM C. COOPER, Primary Examiner